May 28, 1935.　　　　R. D. BOOTH　　　　2,002,565

UTILIZATION OF HIGH PRESSURE GAS

Filed Sept. 13, 1932　　　3 Sheets-Sheet 1

Patented May 28, 1935

2,002,565

UNITED STATES PATENT OFFICE 2,002,565

UTILIZATION OF HIGH PRESSURE GAS

Ralph D. Booth, Brookline, Mass., assignor of one-half to Jackson & Moreland, a partnership and one-half to Standard Oil Development Company, a corporation of Delaware Application September 13, 1932, Serial No. 632,946

6 Claims. (Cl. 62—136)

This invention relates to improvements in the utilization of high pressure gas whereby the formation of frost is eliminated in the expansion of the gas in a turbine or other power producing apparatus at sub-freezing temperatures.

The invention will be fully understood from the following description taken in connection with the accompanying drawings in which latter—

Figure 1:
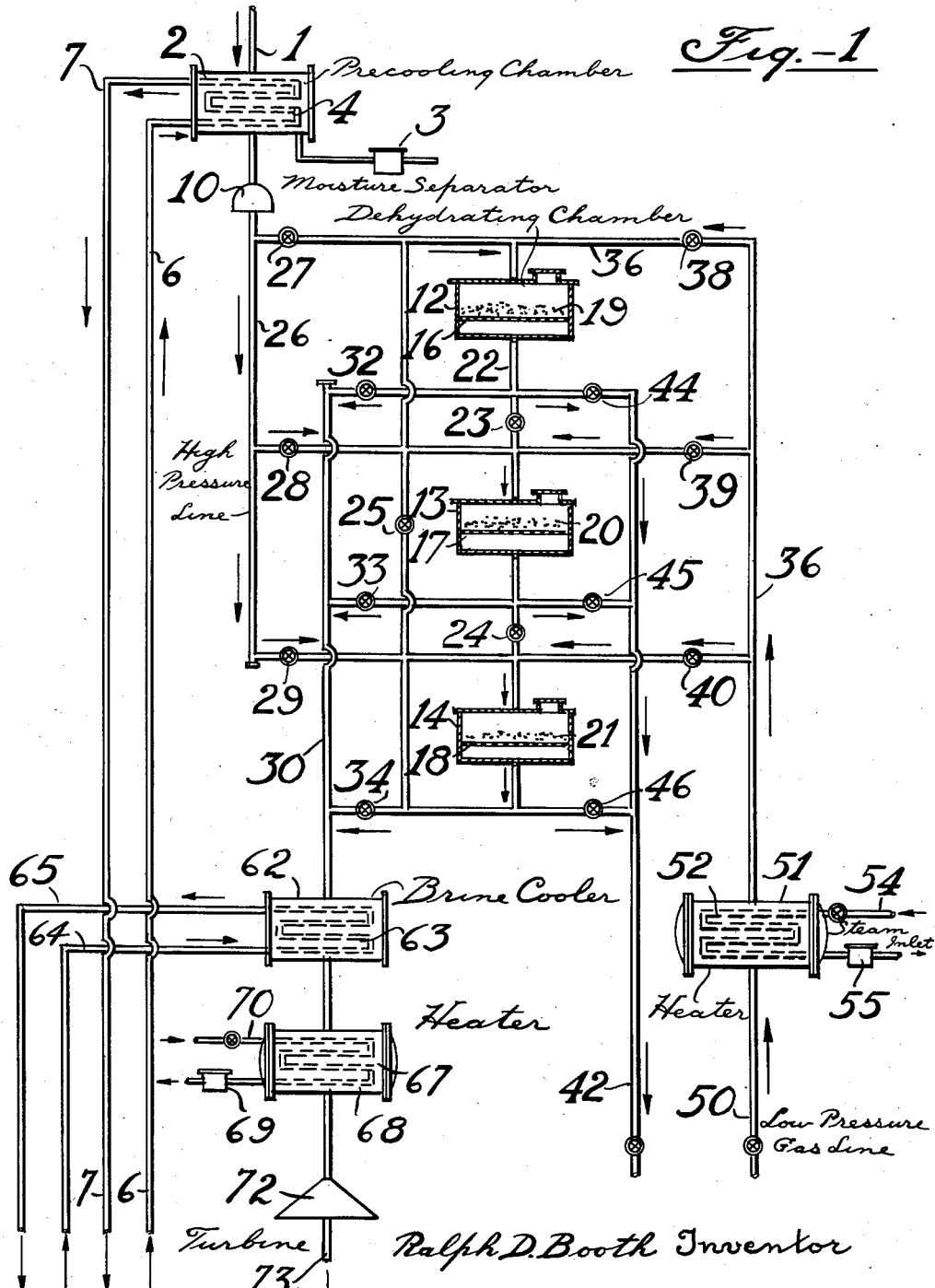

Fig. 1 is a flow diagram illustrating the treatment of the gas at the initial pressure including pre-cooling, separation of moisture precipitated thereby, dehydration, reheating and the first power expansion.

Figure 2:
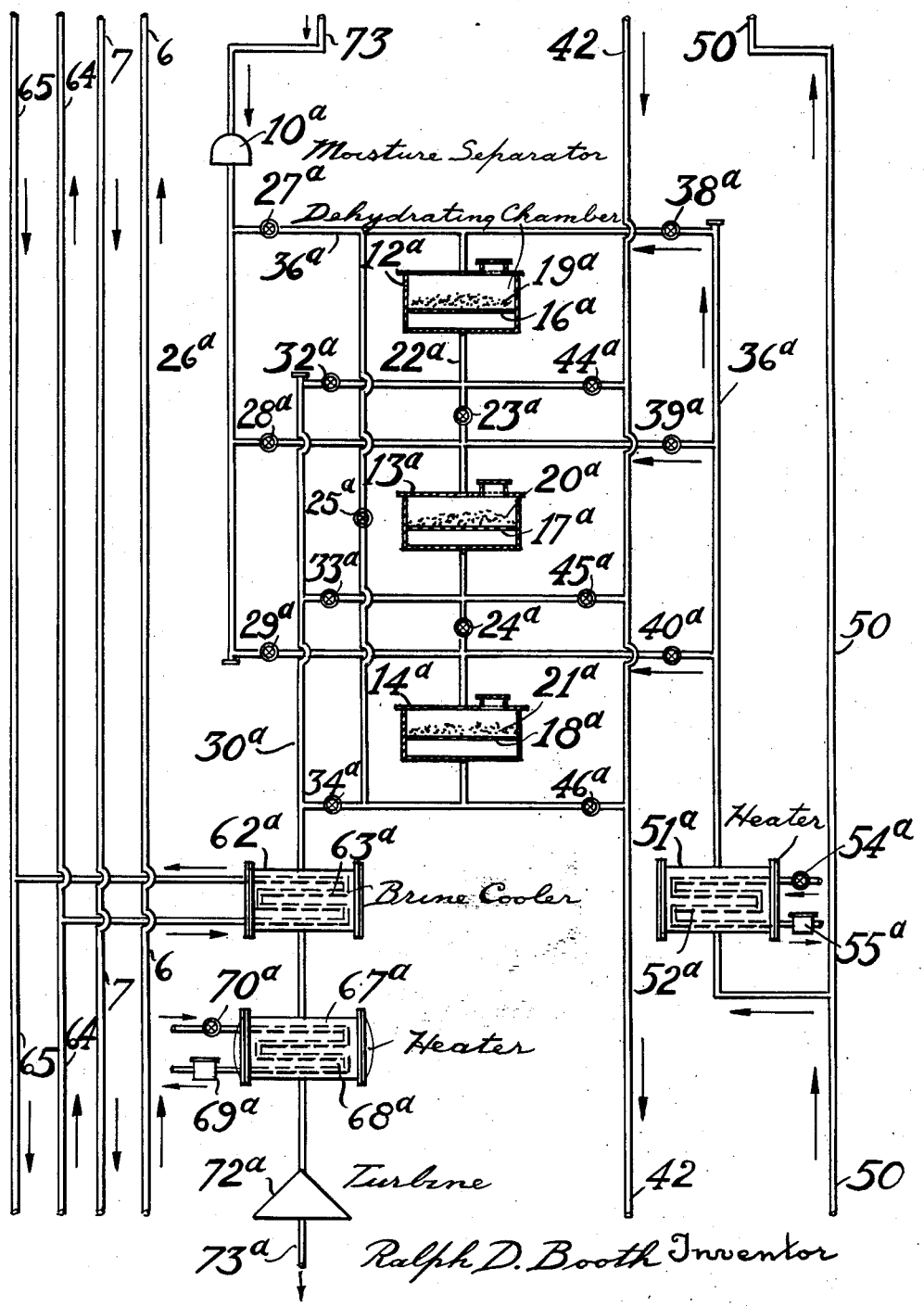

Fig. 2 is a flow diagram constituting a continuation of Fig. 1 and illustrates the treatment of the gas at intermediate pressure including the separation of moisture which may have been precipitated during expansion, a second stage of dehydration, the reheating of the gas by absorption of heat from a refrigerating fluid and the second stage of expansion. It should be understood that where the expansion ratio is small enough to permit frostless expansion in a single stage the apparatus indicated in Fig. 2 may be omitted. Also, it should be understood that the apparatus shown in Fig. 2 may be duplicated as often as convenient where desirable to use a greater number of expansion stages in securing frostless expansion.

Figure 3:
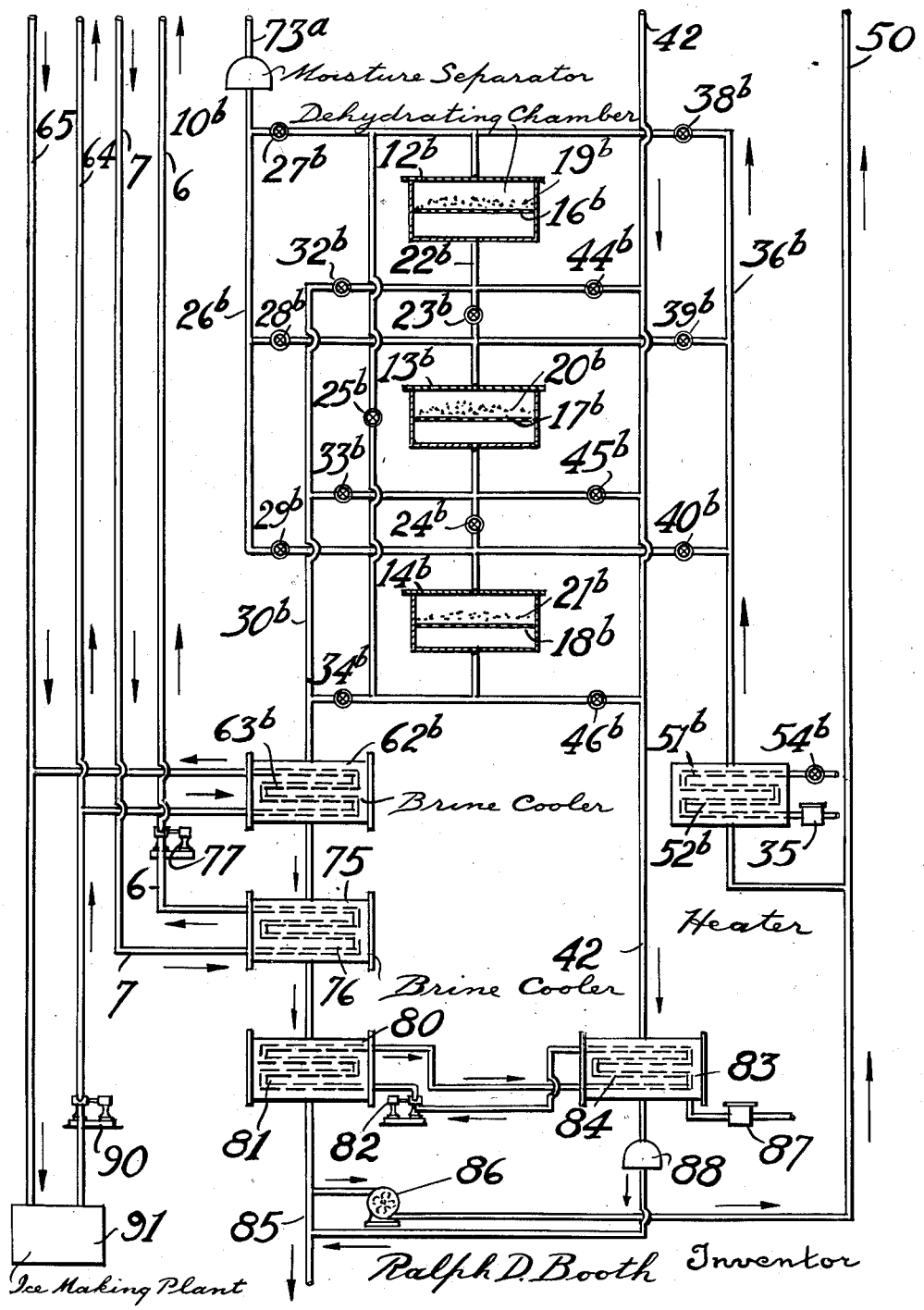

Fig. 3 is a flow diagram illustrating the treatment of the gas after its expansion to the lower pressure has been completed in one, two or more stages. Fig. 3 also illustrates how the refrigerating effect required for the initial precooling in Fig. 1 is obtained from the exhaust gas and also shows how a portion of the exhaust gas is taken from the discharge main for recirculation in the dehydrating chambers for reactivating purposes and how this gas returning from the dehydrating chambers laden with the moisture and other vapors extracted from the dehydrating substance is chilled and the vapors recovered before the gas is returned to the discharge main to be conveyed to the low pressure distribution system.

Referring particularly to Fig. 1, the high pressure gas is conveyed by a pipe 1 to a gas precooling chamber 2 fitted with a trap 3 and containing a pipe coil 4 within which brine or some other cooling medium is circulated from a cold brine header 6 to a warm brine header 7. After serving to pre-cool the high pressure gas this brine may be recooled by any convenient means but, as will be explained in connection with Fig. 3, in this case there is shown the brine cooled by the exhaust gas after its final expansion. The cooling of the high pressure gas in its passage over the pipe coil 4 causes precipitation of a large part of the moisture and other vapors contained therein, the amount of residual vapors not thereby precipitated depending upon the temperature to which the gas is cooled. The precipitated moisture is removed through the trap 3.

From the pre-cooling chamber 2, the gas passes through a moisture separator 10 which may be any one of the various forms of moisture separators known to the art and which serves to remove any precipitated moisture which may have been swept through the pre-cooling chamber 2. The gas leaving the moisture separator 10 still contains residual moisture vapor and is at 100 per cent relative humidity so that any process which tends to increase its relative humidity, such as expansion in a power producing apparatus, would cause further precipitation. In order to render the gas suitable for frostless expansion it is therefore necessary that the relative humidity be sufficiently reduced so that during the subsequent expansion it will not reach 100 per cent. In the arrangement of apparatus disclosed herein this object is accomplished partly in dehydrating chambers 12, 13 and 14. Each of these consists of a box containing a screen supporting a layer of the dehydrating substance as, for example, screens 16, 17 and 18 supporting a dehydrating substance 19, 20 and 21 in the dehydrating chambers 12, 13 and 14 respectively. As will be noted from Fig. 1, the three dehydrating chambers are connected in a chain through a line 22 and valves 23, 24 and 25 between adjacent dehydrating chambers. The dehydrating chambers are connected to a high pressure intake header 26 by valves 27, 28 and 29 and to a high pressure discharge header 30 by valves 32, 33 and 34. Similarly, the dehydrating chambers are connected to a reactivating intake header 36 by valves 38, 39 and 40 and to a reactivating discharge header 42 by valves 44, 45 and 46. This arrangement permits the high pressure gas to be directed through two of the dehydrating chambers in series while the third dehydrating chamber is isolated from the high pressure gas system and connected to the reactivating system. For example, if it is desired to pass the gas through the dehydrating chambers 12 and 13, the high pressure valves 23, 27 and 33 would be open and the high pressure valves 24, 25, 28, 29, 32 and 34, would be closed. The reactivating valves 38, 44, 39 and 45 would be closed and reactivating valves 40 and 46 would be open. The high pressure gas would then pass from the high pressure intake header 26 through the valve 27 through the dehydrating chamber 12, valve 23, dehydrating chamber 13 and valve 33 to the high pressure discharge header 30. At the same time, low pressure gas would be conveyed from a pipe 50 through a reactivating heater 51 containing a pipe coil 52 supplied with steam through valved line 54 and discharging condensate through a trap 55. The low pressure gas heated by passage over the pipe coil 52 would flow through valve 40 and the dehydrating chamber 14 absorbing moisture from a dehydrating substance 21, and then by valved line 46 into the reactivating discharge header 42. After a suitable length of time the steam would be cut off at the valve 54 but the low pressure gas would continue to circulate over the path described and would serve to cool the dehydrating substance 21 in preparation for its use in the high pressure system.

For convenience the dehydrating chamber which the high pressure gas first reaches is designated as the primary dehydrating chamber and the one which the gas next reaches as the secondary dehydrating chamber. When the gas reaches the primary dehydrating chamber, 12 in this case, its relative humidity is high and it therefore readily yields up a large part of its moisture to the dehydrating substance which can therefore function effectively even after its activity has been somewhat reduced by previous absorption of moisture. When the gas reaches the secondary dehydrating chamber, 13 in this case, its relative humidity has already been much reduced by loss of moisture to the dehydrating substance in the primary chamber. It is the function of the dehydrating substance in the secondary chamber to further reduce the relative humidity by extracting a part of the residual water vapor. To perform this function it must have a higher degree of activity than the dehydrating substance in the primary chamber.

When the dehydrating substance 20 in the dehydrating chamber 13 has absorbed moisture to a point where its effectiveness is reduced, the dehydrating chamber 14 is isolated from the reactivating system by closing the valves 40 and 46 and cut into the high pressure system by opening the valves 24 and 34 and closing the valve 33. Then the dehydrating chamber 12 is isolated from the high pressure system by opening the valve 28 and closing valves 27 and 23. It is evident that the high pressure gas now flows from the high pressure intake header 26 through the valve 28, dehydrating chamber 13, (now the primary dehydrating chamber), valve 24, dehydrating chamber 14 (now the secondary dehydrating chamber) and valve 34 to the high pressure discharge header 30. The high pressure gas passing first through the primary dehydrating chamber 13 loses most of its vapors to the dehydrating substance 20 in this chamber and then passes through the freshly reactivated substance 21 in the secondary dehydrating chamber 14. It is therefore seen that the less effective dehydrating substance 20 is still useful for the relatively crude process of removing the bulk of the vapors present while the freshly reactivated substance 21 serves to give a high degree of dehydration. While the high pressure gas is passing through chambers 13 and 14 as just described, the dehydrating chamber 12 which has been isolated from the high pressure system as described above is connected into the reactivating system by opening valves 38 and 44. The steam is again admitted to the pipe coil 52 by opening valve 54 and the low pressure gas heated by steam coil 52 passes into the reactivating intake header 36 and by valve 38 through dehydrating chamber 12 and dehydrating substance 19 and then by valve 44 to the reactivating discharge header 42. As before, after a sufficient interval the steam in pipe coil 52 is cut off by closing the valve 54 and the low pressure gas continues to circulate through dehydrating chamber 12 cooling the dehydrating substance 19 therein. By using three dehydrating chambers in the manner described it is evident that the processes of dehydration and reactivation are carried on at high efficiency since the final dehydration in the secondary dehydrating chamber is accomplished by freshly reactivated substance whereas the relatively crude task of removing the bulk of the moisture is performed in the primary dehydrating chamber by dehydrating substance which has already accomplished its usefulness in secondary dehydration. At the same time, the reactivating process is applied only to the substance which has done its full work in absorbing moisture and which therefore readily yields up this moisture.

The next stage in this process would be for the high pressure gas to pass from the high pressure intake header 26 through the valve 29, dehydrating chamber 14, (primary), valve 25, dehydrating chamber 12 (secondary) and valve 32 into the high pressure discharge header 30. Valves 27, 28, 33, 34, 23, 24, 38, 40, 44 and 46 would be in the closed position. Dehydrating chamber 13 would be connected to the reactivation intake header 36 by opening valve 39 and to the reactivation discharge header 42 by opening valve 45. Obviously this cycle can be repeated indefinitely. It is evident that the arrangement described can be modified by increasing the number of dehydrating chambers as may be desired. For example, it may be convenient to arrange a total of five dehydrating chambers so that there are three active in the dehydrating process while the other two are subject to reactivation and it is also evident that if the number of dehydrating chambers is increased in this way the principle of multi-stage operation can be applied to reactivation as well as to dehydration with similar advantages; namely, so that the hottest and driest reactivating gas is applied to the dehydrating substance in the second stage of reactivation and then passes to the dehydrating chamber which is in the first stage of reactivation. By this means the process of reactivation can be carried out more effectively. Whether or not in any particular case it is desirable to adopt these additional refinements will depend largely upon the degree of effectiveness required in the dehydrating operation.

After dehydration the high pressure gas, still at a low temperature after passing through precooler 2, passes from the high pressure discharge header 30 through a brine cooler 62 containing a pipe coil 63 in which brine is caused to circulate from a warm brine header 64 to a cold brine header 65. The heat interchange occurring in this chamber results in the cooling of the brine and the reheating of the gas. The feasibility of cooling brine for refrigerating purposes at this stage depends, of course, upon the degree to which the gas has been cooled in the precooler 2. If the gas is not cold enough for this purpose the brine cooler 62 may be omitted. From the brine cooler 62 the gas passes to a steam heated gas reheater 67 containing a pipe coil 68 which is fitted with condensate discharge trap 69 and which is supplied with steam through a valve 70. It is evident that depending upon the circumstances of each case it may be desirable to use both the brine cooler and the steam heated gas reheater as indicated in Fig. 1 or it may be desirable to use either of them alone or in some cases the dehydration process alone may be sufficiently complete to secure frostless expansion without any reheating in which case both 62 and 67 could be omitted. After the reheating process the gas passes to a turbine 72 wherein it expands to a lower pressure driving the turbine 72 which furnishes power to an electric generator or other suitable device not shown. From the turbine 72 the gas is discharged by a pipe 73.

Referring to Fig. 2, the gas discharged from the turbine 72 is conducted by the pipe 73 to a moisture separator 10a in which any precipitated moisture is removed. The gas then passes through two of three dehydrating chambers 12a, 13a, and 14a which operate in a manner identical to that already described for the dehydrating chambers in Fig. 1. It will be noted that the designations used in connection with the dehydrating chambers and piping on Fig. 2 correspond with those on Fig. 1. For example, on Fig. 1 the high pressure intake header is 26 and on Fig. 2 it is 26a. Similarly, valve 24 on Fig. 1 occupies the same relative position as valve 24a on Fig. 2. A further description of the operation of this dehydrating equipment for Fig. 2 is therefore unnecessary. From the high pressure discharge header 30a the gas which was chilled during its expansion in turbine 72 passes to a brine cooler 62a containing a pipe coil 63a in which brine is circulated from the warm brine header 64 to the cold brine header 65. The heat interchange between the cold gas and the brine in pipe coil 63a results in the gas being reheated and the brine chilled. The gas heated after passage over the pipe coil 63a may if desired be further reheated by passage through the steam heated gas reheater 67a containing a pipe coil 68a fitted with condensate discharge trap 69a and supplied with steam through a valve 70a. From the steam heated gas reheater 67a the gas, now in suitable condition for further frostless expansion passes to a turbine 72a in which it is expanded and discharged through a pipe 73a. The gas in expanding furnishes power to the turbine 72a which drives an electric generator or other suitable device not shown.

Ordinarily it would not be necessary to provide both the dehydrating and reheating equipment shown in Fig. 2. These two processes each have the effect of reducing the relative humidity and thereby securing frostless expansion in the turbine 72a. In most cases this objective can be secured by the use of either process alone. However, in some cases an unusually high expansion ratio in the turbine 72a or the desirability of operating within a certain temperature range may render it advisable to use both dehydration and reheating. For this reason and in order to make the disclosure complete both processes have been shown.

In Fig. 3 the gas discharged from the turbine 72a (Fig. 2) or from a subsequent turbine if more than two stages of expansion are desirable, or from the turbine 72 (Fig. 1) if a single expansion stage is sufficient, passes by the pipe 73a through a moisture separator 10b which removes any moisture precipitated during expansion. If the gas contains vapors which it is desired to recover it may be passed through two of the three dehydrating chambers 12b, 13b and 14b. The dehydrating chambers and the associated piping are arranged in a manner identical with that shown on Fig. 1 and the designating symbols correspond to those used on Fig. 1. For example, valve 24 on Fig. 1 occupies the same relative position as valve 24b on Fig. 3. It should be noted that the dehydrating process shown on Fig. 3, that is after the last stage of expansion, is provided only to permit the recovery of any vapors which may be present in the gas. If the recovery of these vapors is not desired this dehydration process at this stage may be omitted. The gas after passing through the dehydrating equipment is conducted by a discharge header 30b to a brine cooler 62b containing a pipe coil 63b in which brine is caused to circulate from the warm brine header 64 to the cold brine header 65. The gas is still cold as a result of its expansion in turbine 72a (Fig. 2) and therefore the heat interchange between the brine and the gas results in the heating of the gas and the chilling of the brine. From the brine cooler 62b the gas passes to another brine cooler 75 containing a pipe coil 76 in which brine is caused to circulate from the warm brine header 7 to the cold brine header 6 by a pump 77. The pipe coil 76 is connected by brine headers 6 and 7 with the pipe coil 4 in the gas pre-cooling chamber 2 (Fig. 1). Since the gas entering the brine cooling chamber 75 is still cold, the heat interchange therein results in the heating of the gas and the chilling of the brine which is therefore available as a pre-cooling medium for use in the pipe coil 4. From the brine cooler 75 the gas passes to another brine cooler 80 containing a pipe coil 81 in which brine is caused to circulate by a pump 82. The pipe coil 81 is connected in series with a pipe coil 83 in a gas cooling chamber 84 which is connected into the reactivating discharge header 42. From the brine cooler 80 the gas passes by a pipe 85 to the low pressure distribution system to be used as a fuel or for other purposes.

The gas required for reactivation purposes is taken from the discharge header 85 by a fan 86 and delivered to the main reactivation intake header 50 from which it is delivered through the steam heated gas heating chambers 51, 51a and 51b into the individual reactivation intake headers 36, 36a and 36b. After passing through the dehydrating chambers it is returned by the reactivating discharge header 42 to the gas cooler 84 containing the pipe coil 83. The cold brine in the pipe coil 83 serves to chill the reactivating gas which has absorbed vapors from the dehydrating substance in the various dehydrating chambers 12, 13, 14, 12b, 13b, 14b etc. The cooling of this gas causes the precipitation of the vapors contained therein. The liquid resulting from this precipitation is collected at drain 87. From the chamber 84, the gas passes through a moisture separator 88 in which any precipitated liquid which may have been swept through chamber 84 is recovered. From the separator 88 the reactivating gas returns to the discharge header 85.

The brine which has been chilled in the gas reheating chambers 62, 62a, and 62b may be utilized for any refrigerating purposes which are desirable and if convenient the cold brine from each of these gas reheating chambers may be used for a separate refrigerating purpose. However, for simplicity there is shown in this disclosure the cold brine from all three brine cooling chambers gathered into a common system comprised of the headers 64 and 65 in which the brine is caused to circulate by a pump 90. The cold brine is delivered by the header 65 to an ice making plant 91 in which the brine absorbs heat in the process of freezing water, and then returns to the header 64. No details of the ice plant are shown as these could be substantially identical with the brine cooled freezing apparatus in common use. Of course, the cold brine could be used for any other refrigerating or cooling purposes, or instead of using brine any other suitable refrigerating medium could be used, or the substance to be refrigerated, if of suitable characteristics, could itself be circulated in the pipe coils 63, 63a and 63b. Any of these modifications would not affect the principle disclosed herein. Similarly, the brine coolers shown as chambers containing pipe coils could be made in various different forms, such as shell-and-tube coolers or double pipe coolers without affecting the principle.

In the procedure disclosed the gas to be expanded is first pre-cooled thereby securing the advantage of a lower exhaust temperature and causing precipitation of a large part of the contained water vapor. After the gas has been pre-cooled and the precipitated moisture removed the gas still contains residual water vapor and is at 100 per cent relative humidity. Such a gas is not suitable for frostless power expansion at freezing temperature when in this condition. Therefore the gas is passed through a suitable dehydrating substance which reduces the relative humidity of the gas. The gas in this condition may under certain circumstances be expanded in the turbine without frost precipitation or, in order to obtain still further reduction of the relative humidity and therefore a wider range of frostless expansion, the gas after passing through the dehydrating equipment may be reheated. Depending upon the temperature of the gas after pre-cooling and dehydration this reheating may some times be used as a refrigerating process in which the heat for reheating the gas may be absorbed from some substance which it is desired to refrigerate. If the temperature of the gas is too high to make this process feasible, steam or hot water may be used as a source of the heat necessary for reheating. If desirable the reheating may be accomplished by a combination of both processes; that is the first stage of reheating may be accomplished by refrigerating some other substance and the second stage by absorbing heat from steam coils. After dehydration with or without reheating as the case may be, the gas may be expanded in a turbine or other power producing apparatus without causing frost precipitation.

The range of expansion which is permissible without danger of frost formation naturally depends upon the degree to which the relative humidity has been reduced by the processes of dehydrating and reheating. In order to keep this expansion range within limits which are convenient for the dehydrating equipment available and which will not require too high a temperature of reheating it is sometimes desirable to carry out the expansion of the gas in several stages, in which case the processes of dehydration and reheating either may be repeated between expansion stages. Since the expansion in the power producing apparatus causes a substantial drop in temperature, the reheating process after expansion can ordinarily be accomplished by absorbing the necessary heat from some substance which it is desired to refrigerate. However, this process of refrigeration can be supplemented by the use of heat from other sources such as steam coils if this proves desirable. It is not necessary that both dehydration and reheating be employed at each pressure before and after the various expansion stages. It may prove more convenient to use dehydration alone prior to the initial expansion and reheating alone thereafter or under varying circumstances other combinations may be desirable.

By dehydration alone frostless expansion can be obtained down to relatively low temperatures without requiring the use of fuel (except in minor amounts for reactivating purposes) and without impairing the refrigerating effect inherently available from power expansion. The same result can be obtained by a suitable combination of pre-cooling, precipitation and reheating. By pre-cooling in advance of dehydration a large proportion of the water vapor present in the gas can be eliminated by precipitation and the duty imposed upon the dehydrating equipment thereby reduced, with a corresponding saving in the equipment required for dehydration and reactivation. At the same time the precooling will reduce the minimum temperature available and thereby increase the value of the refrigerating effect. By heating after dehydrating the reduction in relative humidity necessary for frostless expansion is more readily accomplished than by dehydrating alone, and therefore a lower degree of activity is permissible in the dehydrating substance, with a corresponding saving in the dehydrating and reactivating equipment. The advantages of multi-stage expansion are in the opportunity afforded to apply the processes of dehydration and reheating (or either) at the intermediate pressures and thereby to keep the temperature and relative humidity more readily within acceptable limits.

In removing water vapor from a gas by the process of dehydration the dehydrating substance through the absorption of moisture gradually loses its power to absorb further moisture and periodically must be either replaced with new material or restored to its initial condition by the removal of the absorbed moisture. This process is called reactivation and is frequently accomplished by bringing the dehydrating substance into contact with hot dry air which serves to remove the moisture. In this application I disclose a method whereby this reactivation is accomplished by using the gas itself as a reactivating medium instead of air. When the gas is of an inflammable nature this process avoids the production of explosive mixtures of air and gas which would result from the use of air as a reactivating medium and renders it unnecessary to purge the dehydrating equipment after each reactivating cycle, thereby avoiding waste of the gas which is involved in the purging process.

In some cases the gas which is being expanded may contain condensible vapors which it is desired to recover. In the process of dehydration these vapors, as well as the water vapor would be absorbed by the dehydrating substance and then recovered in the reactivating gas. There has therefore been provided means for precipitating these vapors from the reactivating gas. After precipitation they can be recovered by a moisture separator of any one of various types known to the art.

Various changes may be made within the scope of the appended claims in which it is desired to claim all novelty inherent in the invention as broadly as the prior art permits.

I claim:

1. The method of treating gas, which comprises partially expanding the gas to perform work whereby the gas is chilled, dehydrating the thus treated gas, passing the dehydrated gas in heat exchange with a warmer substance, and further expanding the thus treated gas to perform additional work.

2. The method of treating gas, which comprises cooling the gas sufficiently to cause condensation of condensible vapors in the gas, removing the condensate from the gas, exposing the thus treated gas to a hygroscopic substance to further remove vapors from the gas, partially expanding the vapor free gas to perform work whereby the gas is chilled, subjecting a warmer substance to the chilled gas whereby the gas is warmed, and further expanding the thus treated gas to perform additional work.

3. The method of treating gas, which comprises partially expanding the gas to perform work whereby the gas is chilled sufficiently to cause condensation of vapors, separating the condensate from the chilled gas, exposing the thus treated gas to a hydroscopic substance to remove condensible vapors, passing the residual gas in heat exchange with a warmer substance, and further expanding the thus treated gas to effect additional work.

4. The method of treating gas, which comprises subjecting the gas to a hygroscopic substance to remove condensible vapors from the gas, partially expanding the gas to perform work whereby the gas is chilled, exposing the chilled gas to a hygroscopic substance to remove additional condensible vapors, and further expanding the thus treated gas to perform work.

5. The method of treating gas, which comprises cooling the gas to condense water vapor contained in the gas, separating the condensate from the gas, exposing the separated gas to a hygroscopic substance to remove condensible vapors, partially expanding the treated gas to perform work, separating additional water vapors from the expanded gas, and further expanding the thus treated gas to perform additional work.

6. Apparatus for expanding gas containing moisture, which comprises a line adapted to carry the gas, power producing means communicating with the line operable by the partial expansion of the gas to lower pressure whereby the gas is chilled and vapors are condensed, means for separating the gas from the condensate, means for treating the separated gas with a hygroscopic substance to remove condensible vapors, means for heating the thus treated gas, and power producing means communicating with the heating means operable by the further expansion of the gas to lower pressure.

RALPH D. BOOTH.